(12) United States Patent
Raisanen et al.

(10) Patent No.: US 9,413,763 B2
(45) Date of Patent: Aug. 9, 2016

(54) COORDINATION BETWEEN SELF-ORGANIZING NETWORKS

(75) Inventors: Vilho Ilmari Raisanen, Helsinki (FI); Haitao Tang, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 256 days.

(21) Appl. No.: 14/003,016

(22) PCT Filed: Feb. 14, 2011

(86) PCT No.: PCT/EP2011/052142
§ 371 (c)(1),
(2), (4) Date: Oct. 7, 2013

(87) PCT Pub. No.: WO2012/110078
PCT Pub. Date: Aug. 23, 2012

(65) Prior Publication Data
US 2014/0026197 A1    Jan. 23, 2014

(51) Int. Cl.
G06F 15/177 (2006.01)
H04L 29/06 (2006.01)
H04W 24/04 (2009.01)
H04W 92/14 (2009.01)

(52) U.S. Cl.
CPC ............... H04L 63/10 (2013.01); H04W 24/04 (2013.01); H04W 92/14 (2013.01)

(58) Field of Classification Search
CPC .............................. H04L 63/10; H04W 92/14
USPC .................................................. 726/1, 2, 3, 4
See application file for complete search history.

(56) References Cited

U.S. PATENT DOCUMENTS

| 2010/0299419 A1* | 11/2010 | Ramankutty | H04W 24/02 709/221 |
| 2012/0059923 A1* | 3/2012 | Cleary | H04W 24/00 709/223 |

OTHER PUBLICATIONS

International Search Report and Written Opinion dated Dec. 6, 2011 corresponding to International Patent Application No. PCT/EP2011/052142.
Huawei, "Proposal for Centralised SON Architecture for Handover Parameter Optimisation," 3GPP Draft, 3GPP TSG-SA5 (Telecom Management), S5-090012, Meeting SA5-RAN3 Joint Meeting, Jan. 12-13, 2009, XP050335479, 7 pages.
Vodafone, "SON Philosophy for LTE," 3GPP Draft, 3GPP TSG-SA5 (Telecom Management), S5-071275, Meeting SA5#54, Jun. 25-29, 2007, XP050305927, 6 pages.

* cited by examiner

*Primary Examiner* — Brandon Hoffman
*Assistant Examiner* — Nega Woldemariam
(74) *Attorney, Agent, or Firm* — Squire Patton Boggs (US) LLP (57) ABSTRACT

A mechanism to handle conflict situations relating to a situation in which an intended SON operation at or near the domain's boundary (border area) may impact on one or more cells in a neighboring domain comprises a single-domain coordinator that assesses whether there may be an impact on the neighboring domain, and if yes, requests an inter-domain, coordinator to check and assess whether there is a conflict.

18 Claims, 3 Drawing Sheets

COORDINATION BETWEEN SELF-ORGANIZING NETWORKS

FIELD

The present invention relates to communication networks, and in particular, to self-organizing networks.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

The evolvement of communication technology, especially the wireless communication technology, has increased the complexity of networks and the amount of network nodes, thereby increasing operation and maintenance tasks i.e. management tasks. To automate at least some of the tasks a concept called a self-organizing network (SON) is introduced by Next Generation Mobile Networks (NGMN) Alliance and 3GPP (Third Generation Partnership Project) to be used first in long term evolution (LTE) access network, and later on in other networks, both in access and core networks. A self-organizing network is capable to self-configure and continuously self-optimize itself in response to network and traffic changes. In such a network, the network and/or a network node alters automatically, without human involvement, its configuration parameters, such as transmission and/or reception parameters, by means of different self-organizing network functions. One of the ideas is that a "plug and play" network nodes supporting SON functionality can be bought from any vendor. However, instead of buying single network nodes, a communication service provider may buy vendor-specific domains, and/or organize network nodes bought from different vendors to different vendor-specific domains, each covering a geographical area and not knowing run-time situation of other domains, and then there arises a need to ensure a co-operation between different vendor-specific domains in their border area.

SUMMARY

An object of the present invention is to provide a mechanism to inter-domain coordination. The object of the invention is achieved by methods, an apparatus, a system and a computer program product which are characterized by what is stated in the independent claims. The preferred embodiments of the invention are disclosed in the dependent claims.

An aspect of the invention provides assessing/evaluating in a domain whether an intended SON operation at or near the domain's boundary (border area) may impact on one or more cells in a neighboring domain and if there is a possibility of such an impact, a check is made to determine whether or not there is a direct or indirect conflict, and depending on the outcome of the check, the intended SON operation may be rejected or authorized.

An aspect of the invention provides, in the domain, domain management level coordinator that performs the assessment and a network management level coordinator that performs the conflict checking concerning the neighboring domain(s).

An advantage is that the mechanism facilitates the two or more vendor-specific domains bought from different vendors to work together.

BRIEF DESCRIPTION OF THE DRAWINGS

In the following, embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any communication system or any combination of different communication systems and corresponding networks and network nodes that support self-organizing network functionality. The communication system may be a wireless communication system or a communication system utilizing both fixed networks and wireless networks or a fixed communication system. The specifications of communication systems and networks, especially in wireless communication, develop rapidly. Such development may require extra changes to an embodiment. Therefore, all words and expressions should be interpreted broadly and they are intended to illustrate, not to restrict, the embodiment.

Figure 1:
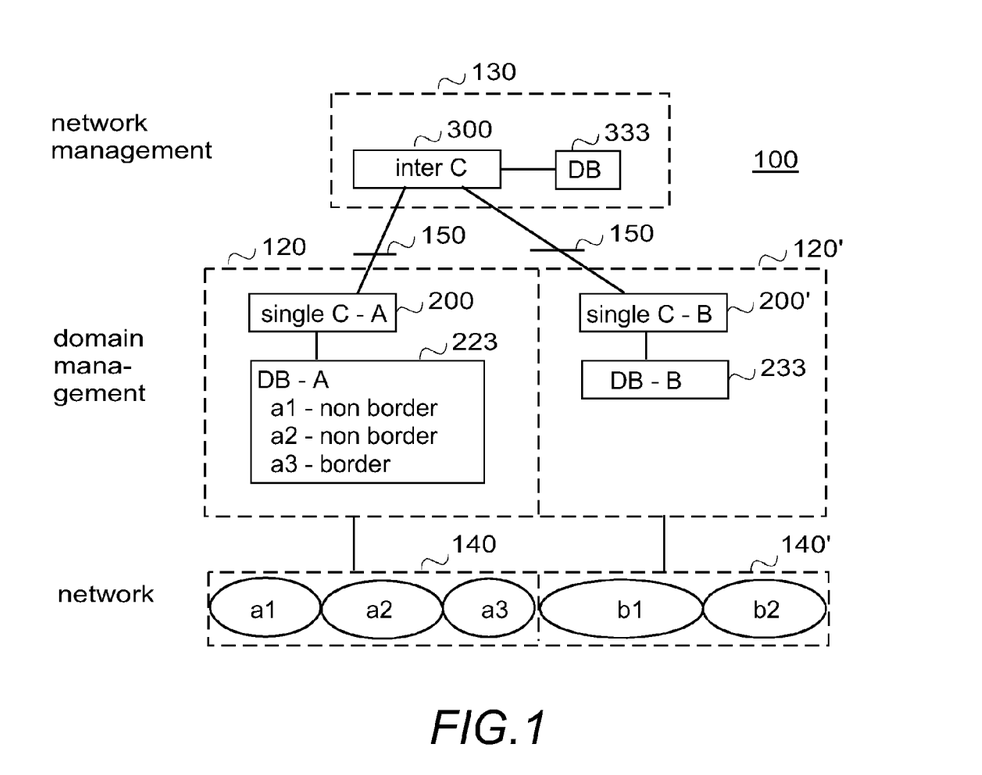
FIG. 1 shows simplified architecture of an exemplary system.

Below an acronym SON is used to mean self-organizing network. A general architecture of a communication system 100 providing self-organizing network functionality is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures including SON functions that are not illustrated. Further, It should be appreciated that the actual functions and measurements used in self-optimization, self-configuration and self-healing, structures, elements and the protocols used in or for information exchange, including control information, and topology information, and in or for database/domain/network management, are irrelevant to the actual invention. Therefore, they need not to be discussed in more detail here.

The illustrated parts of the communication system 100 in FIG. 1 are a network management subsystem 130, two vendor-specific domain management subsystems 120, 120', and corresponding vendor-specific radio access networks 140, 140' supporting SON functionality, each radio access network forming a vendor-specific domain.

It bears no significance to embodiments how SON functions are allocated (i.e. distributed, centralized and hybrid/multi-layer manner may be used) and the allocation may differ from a vendor-specific domain to a vendor-specific domain.

Further, embodiments are implementable regardless of where the SON functions are implemented (at network element level, at vendor-specific domain manager level, and/or at vendor-specific network management level). Examples of SON functions include mobility load balancing, handover optimization, cell outage management, and mobility robustness optimization. In the illustrated example, the network management system comprises an inter-domain coordinator 300 (inter C). The inter-domain coordinator may locate in an operations, administration and maintenance (OA&M) and more specifically be part, of the network management functionality in an operation support system. The inter-domain coordinator may be any apparatus or device or equipment able to carry out one or more of the processes described below. A more detailed description of an exemplary inter-domain coordinator is described in detail with FIG. 3. The network management system further comprises a network node or a logical entity 333 having a database whereto at least topology information on radio access networks is stored. The database may further comprise information on cells and functions, for example. The database may be of any type, have any possible storage structure and being managed by any database management system. It should be appreciated that the content in a corresponding database depends on implementation details and information needed for authorization, as will be explained below. Further, the content in the database for inter-domain coordinator may be different for different vendor domains. The database may comprise abstracted network information (including the topology information) to allow the communication service provider to control all radio access network parameters and all SON functions although there are hundreds of different radio access network parameters, many of them are interpreted differently by different vendor's network nodes, and most SON functions are vendor- and/or release-specific. By means of the abstraction, the communication service provider can have in the database only limited amount of network information, like abstract properties and their associated functions, in a form that is vendor-independent, release-independent and interpretation-independent. The mapping between an abstract property and its vendor/release/interpretation-specific parameter(s) is then performed in the vendor-specific domain. Similarly, the mapping between an abstract function and its vendor/release/interpretation-specific function(s) is then performed in the vendor-specific domain. For example, the single domain coordinator may be configured to perform the mapping. An advantage provided by the abstraction is that the communication service provider is thus free from vendor-specific details and can focus on vendor-independent operations.

In the illustrated example, each domain management system 120, 120' comprises a single-domain coordinator (single C) 200, 200', one for vendor A domain and one for vendor B domain, connected over a standardized interface Itf-N 150 to the inter-domain coordinator 300. The single-domain coordinator 200, 200' may locate in OA&M. The single-domain coordinator 200, 200' may be any apparatus or device or equipment able to carry out one or more processes as will be described below. A more detailed description of an exemplary single-domain coordinator is described in detail with FIG. 2.

Each domain management system 120, 120' comprises a network node or a logical entity having a database for storing topology information on the domain in question. The database may be of any type, have any possible storage structure and being managed by any database management system. In the illustrated example the database 223 of a vendor A comprises, in addition to the topology of the radio access network 140 of vendor A, cell-specifically information whether or not the cell is a border cell, i.e. whether or not a cell locates in the border area, whereas the database 233 of vendor B comprises topology information of the radio access network 140' of vendor B. It should be appreciated that the content in a corresponding database depends on implementation details and configuration of a corresponding single-domain coordinator, as will be explained below, and it suffices that it contains some information based on which it can be determined which cells locate in the border area. Further, it should be appreciated that it bears no significance where the databases, or part of a database, locate.

The radio access network 140 comprises cells a1, a2 and a3, and the radio access network 140' comprises cells b1 and b2. It should be appreciated that the inter-domain coordinator and/or the single-domain coordinators may be in one network node or distributed to two or more network nodes, or distributed between SON functions.

Figure 2:
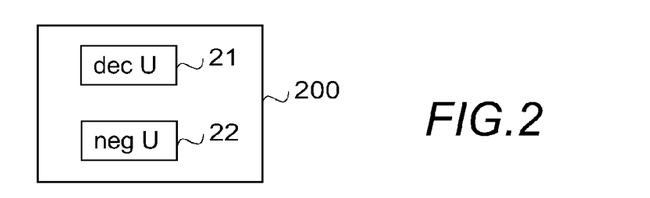
FIGS. 2 and 3 are schematic block diagrams of exemplary apparatuses.

FIG. 2 is a simplified block diagram of a network node, or a corresponding apparatus or corresponding network equipment, that may be used in embodiments as an single-domain coordinator. The network node 200 is a computing device configured to perform one or more of an single-domain coordinator (i.e. vendor-specific coordinator) functionalities described with an embodiment, and it may be configured to perform functionalities from different embodiments. For this purpose, the network node comprises a deciding unit (dec U) 21 for obtaining information from the database and for using the information to decide how to handle a request. Further, the single-domain coordinator may comprise a negotiating unit (neg U) 22 for negotiating with the inter-domain coordinator on actions to be taken. The deciding unit and/or the negotiating unit may be separate units or integrated to another unit in the network node or they may even locate in different network nodes. In other embodiments, the deciding unit 21, or part of its functionality, may locate in another network node than the negotiating unit 22, or part of its functionality. The functionalities of the deciding unit 21 and the negotiating unit 22 are described in more detail below.

Figure 3:
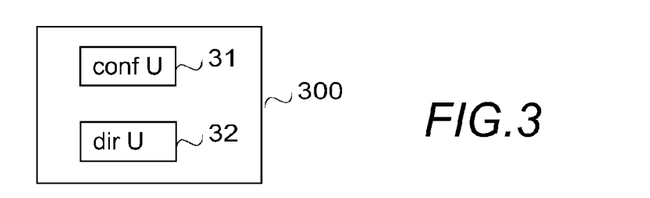

FIG. 3 is a simplified block diagram of a network node, or a corresponding apparatus or corresponding network equipment, that may be used in embodiments as an intra-domain coordinator. The network node 300 is a computing device configured to perform one or more of an intra-domain coordinator network node functionalities described with an embodiment, and it may be configured to perform functionalities from different embodiments. For this purpose, the network node comprises a conflict detecting unit (conf U) 31 for using topology information stored to the network management to decide whether or not to authorize a request. The network node may also comprise a directing unit (dir U) 32 for directing a single-domain coordinator to take an action. The conflict detecting unit and/or the directing unit may be separate units or integrated to another unit in the network node. In other embodiments, the conflict detecting unit 31, or part of its functionality, may locate in another network node than the instructing. The functionalities of the conflict detecting unit 31 and the directing unit 32 are described in more detail below.

The units illustrated in FIG. 2 and in FIG. 3 may be software and/or software-hardware and/or firmware components (recorded indelibly on a medium such as read-only-memory or embodied in hard-wired computer circuitry). The techniques described herein may be implemented by various means so that an apparatus implementing one or more functions of a corresponding entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. Software codes may be stored in any suitable, processor/computer-readable data storage medium(s) or memory unit(s) or article(s) of manufacture and executed by one or more processors/computers.

A network node, or a corresponding apparatus, or corresponding network equipment implementing functionality or some functionality according to an embodiment may generally include a processor (not shown in FIG. 2 or in FIG. 3), controller, control unit, micro-controller, or the like connected to a memory and to various interfaces of the apparatus. Generally the processor is a central processing unit, but the processor may be an additional operation processor. The deciding unit, and/or the negotiating unit, and/or the conflict detecting unit, and/or the directing unit may be configured as a computer or a processor, or a microprocessor, such as a single-chip computer element, or as a chipset, including at least a memory for providing storage area used for arithmetic operation and an operation processor for executing the arithmetic operation. The deciding unit, and/or the negotiating unit, and/or the conflict detecting unit, and/or the directing unit may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments. In other words, the deciding unit, and/or the negotiating unit, and/or the conflict detecting unit, and/or the directing unit may be an element that comprises one or more arithmetic logic units, a number of special registers and control circuits. Further, the network node may comprise other units, and it comprises different interface units, such as a receiving unit (not illustrated in FIG. 2 or FIG. 3) for receiving different inputs, control information, requests and responses, for example, and a sending unit (not illustrated in FIG. 2 or FIG. 3) for sending different outputs, control information, responses and requests, for example. The receiving unit and the transmitting unit each provides an interface in an apparatus, the interface including a transmitter and/or a receiver or a corresponding means for receiving and/or transmitting information, and performing necessary functions so that content, control information, etc. can be received and/or transmitted. The receiving and sending units may comprise a set of antennas, the number of which is not limited to any particular number.

The network node, or a corresponding apparatus, or network equipment may generally include volatile and/or non-volatile memory (not illustrated in FIG. 2 or in FIG. 3), for example EEPROM, ROM, PROM, RAM, DRAM, SRAM, double floating-gate field effect transistor, firmware, programmable logic, etc and typically store content, data, or the like. The memory may also store computer program code such as software applications (for example, for the management unit) or operating systems, information, data, content, or the like for the processor to perform steps associated with operation of the apparatus in accordance with embodiments. The memory, or part of it, may be, for example, random access memory, a hard drive, or other fixed data memory or storage device implemented within the processor/network node or external to the processor/network node in which case it can be communicatively coupled to the processor/network node via various means as is known in the art. An example of an external memory includes a removable memory detachably connected to the apparatus.

It should be appreciated that the apparatuses may comprise other units used in or for information transmission, in or for network/domain management systems, and/or for database management systems, which store database contents, allowing data creation and maintenance, and search and other access obtaining data from the database unit. However, the invention poses no specific requirements for them and, therefore, they need not to be discussed in more detail here.

Figure 4:
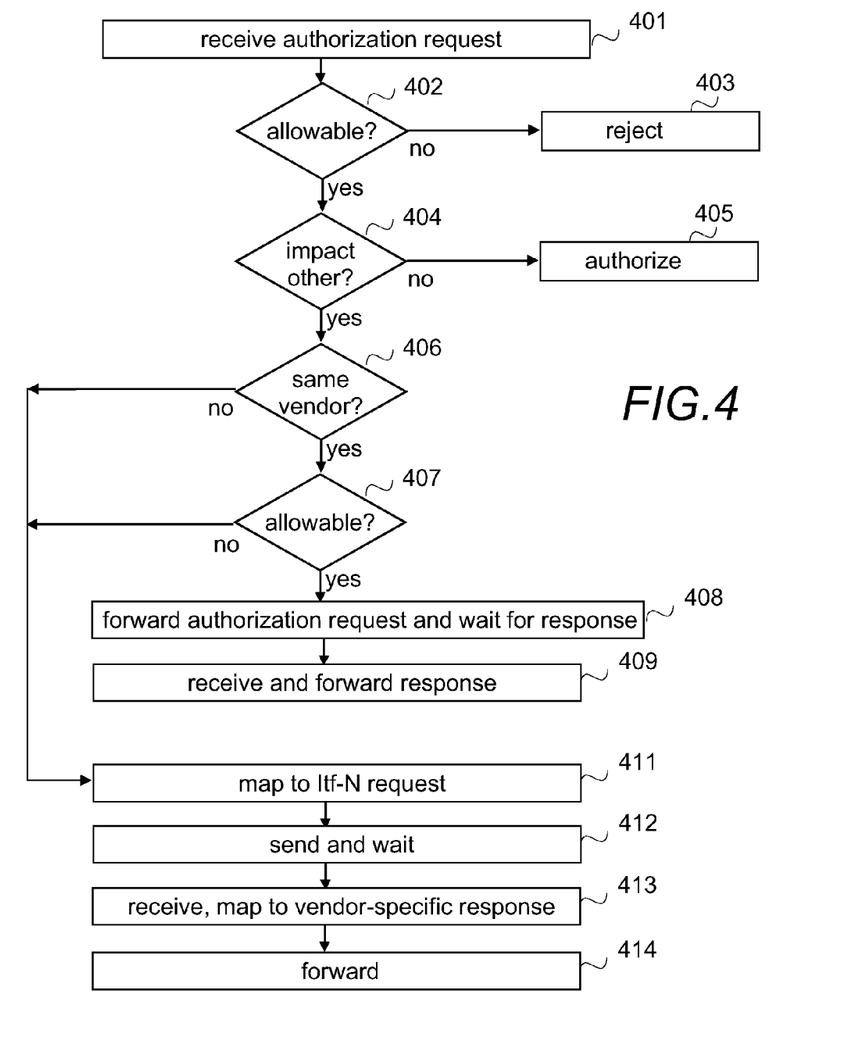
FIGS. 4 and 5 are flow charts illustrating functionality of apparatuses according to an embodiment.

FIG. 4 is a flow chart illustrating an exemplary functionality of the single-domain coordinator, or more precisely the deciding unit, according to an embodiment. In the embodiment it is assumed that if network elements from the same vendor are organized to two or more different vendor domains (for ease of the management, for example), a vendor-specific communication can be sent between single-domain coordinators in the different vendor domains for certain, predefined SON functions.

Referring to FIG. 4, the single-domain coordinator receives, in step 401, an authorization request from a SON function instance, the authorization request requesting permission to perform one or more operations. Below it is assumed, for the sake of clarity, that the request is for only one SON operation. The authorization request may be a "power up" or "decrease cell size", for example. An example of the content in the authorization request is as follows: "Cell x, tilt-up delta 2 degrees."

In response to receiving the request, the single-domain coordinator uses, in step 402, the vendor-specific coordination policy (or domain-specific policy) to decide whether to authorize or to reject the request. In other words, it is checked, whether or not the request is allowable within the domain. If the authorization request does not fulfill the policies, the request is rejected in step 403. If, according to the policies, the request is allowable, i.e. can be authorized, the single-domain coordinator assesses (evaluates) in step 404, whether or not there is a possibility that the operation in the authorization request may have an impact (direct or indirect) on cells in the neighboring domain. For the assessment, the single-domain coordinator may use information from its database for determining whether or not a border cell is involved in the operation, and if yes, detect an impact. Examples of such information include coordinates in the topology information, and cell-specific information, like in the database of vendor A in the example of FIG. 1. More advanced methods, like semantic models, may also be used.

If the outcome of the assessments is that the requested operation may not have impact on cells in the neighboring domain (step 404), the single-domain coordinator authorizes, in step 405, the request.

If the outcome of the assessments is that the requested operation may have impact on cells in the neighboring domain (step 404), the single-domain coordinator checks, in step 406, whether or not the vendor of the neighboring domain is the same. This information may be stored in the domain-specific database and be, for example, associated with cell-specific information. If the vendor is the same, the single-domain coordinator checks, in step 407, whether or not it is allowable to interact with the neighboring single-domain coordinator on the matter the authorization request relates to. In the example, it depends on the SON function the authorization request relates to. It should be appreciated that other rules may be given. If the single-domain coordinators are allowed to interact (step 407), the single-domain coordinator forwards, in step 408, the authorization request to a single-domain coordinator in the neighboring network, and waits for, in step 408, a response. After receiving the response the single-domain coordinator forwards, in step 409, the response to the SON function instance wherefrom it received the authentication request in step 401.

If the vendor is not the same (step 406), or if the single-domain coordinators are not allowed to interact (step 407), the single-domain coordinator forms, in step 410, using the information received in step 401, a request that complies with Itf-N. In other words, the single-domain coordinator maps the request to an Itf-N request. For example, the authorization request "Cell x, tilt-up delta 2 degrees", may be after the mapping as follows: "Cell x, coverage +18%, coverage heading same". Hence, the mapped request identifies the operation(s), specifies the cell(s) and the requested change or relevant parameters. Instead of, or in addition to, the operation (called also action), the SON function instance may be identified in the mapped request. The specified cells may be those to which the operation is targeted to or those specifying the scope of the SON function instance, like a predefined or ad hoc list of cells. The requested change, or relevant parameters, may be described completely including exact values or by means of a simplified expression. The simplified expression utilizes previously defined criteria that make the expression unambiguous both to the single-domain coordinator and to the inter-domain coordinator. An example of a simplified expression is "small change to coverage". The simplified expressions and the criteria may be defined during design time of the system by the communication service provider, and they are preferably vendor-independent After that the single-domain coordinator sends, in step 411, the mapped request in the Itf-N format to the inter-domain coordinator and waits, in step 411, for a response. When the response is received, in step 412, in the Itf-N format, the single-domain coordinator maps the response, in step 412, to be according to vendor-specific format. Then the mapped response is sent, in step 413 to the SON function instance wherefrom the single-domain coordinator received the authentication request in step 401.

In another embodiment, all requests that may have impact to the neighboring domain, are mapped to Itf-N format (i.e. steps 406-409 are left out).

In a still further embodiment, the communication network provider requires that certain inter-domain decisions need to be approved by the communication network provider. In the embodiment, the single-domain coordinator is configured to check before forwarding authorization request to the other single-domain coordinator of the same vendor (i.e. between steps 406 and 408), whether the requested SON action need to be approved, and if the approval is needed, the single-domain coordinator will request it, i.e. perform steps 410-413, otherwise steps 408-409 are performed.

In a yet further embodiment, vendor-specific domains having the same vendor are always allowed to interact with each other, i.e. step 407 is skipped in the embodiment.

Further, the mapping includes, in an embodiment where the abstraction in the topology information on network management level is utilized, the mapping between an abstract property and its vendor/release/interpretation specific parameter(s); in Itf-N format the information is in the vendor-independent format whereas information exchanged within the domain is in a vendor-specific format.

An advantage provided by using the Itf-N and letting the inter-domain coordinator to decide operations that may have inter-domain impacts is that it suffices that the single-domain coordinator is configured to support, in addition to its own messaging format, which may be vendor-specific, the standard operation and maintenance interface Itf-N. If, instead of the centralized inter-domain coordinator, operations that may have inter-domain impacts would be decided by the single-domain coordinators in the domains, a specific domain manager-level component would be needed for each single-domain coordinator pairs to make the deciding possible. Each component should be configured by the communication service provider, and should the communication service provider make a small policy change, for example, all components would need a reconfiguration. One reason for the need of the components is that currently there are no standardized interfaces on domain management level between different domains. Further, usually when the abstraction is implemented to have manageable amount of data, a vendor domain is very limitedly visible to the communication service provider, and to vendor domains of other vendors, which make the configuration of the components more challenging. As said above, when the inter-domain coordinator is used, there is no need for the components and their configurations, without restricting the possibility to use of vendor-specific messaging/control information exchange within a domain, and, depending on implementation, between domains of the same vendor.

Figure 5:
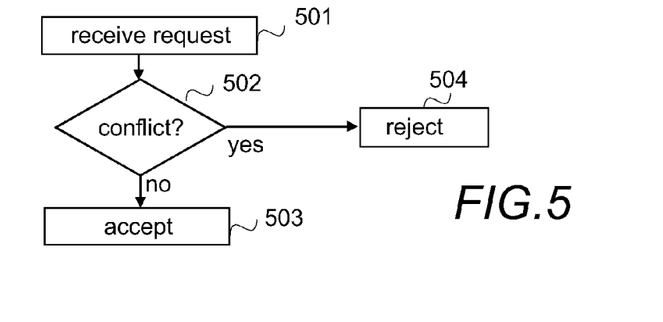

FIG. 5 is a flow chart illustrating an exemplary functionality of the inter-domain coordinator, or more specifically functionality of the conflict detecting unit. Referring to FIG. 5, the inter-domain coordinator receives, in step 501, a request from the single-domain coordinator, the request relating to a SON operation. Examples of possible request contents are disclosed with FIGS. 4 and 6. Then the inter-domain coordinator identifies and assesses, in step 502, whether or not the intended operation causes a conflict (direct or indirect). Different ways, such as semantic models, to identify and assess conflicts may be used. Also the communication service provider's coordination policy may be used to assist to decide and assess whether or not there is conflict (or a conflict that is small enough to be interpreted as no conflict). For example, using the radio access networks in FIG. 1 as an example, if the operation would alter the size and/or form of cell b1 so that it would overlap with cell a3, and the communication service provider's policy defines that 3% overlap is allowable, it depends on the size of the overlap whether there is a conflict (overlap more than 3%) or not (overlap at most 3%).

If the inter-domain coordinator deems that there is no conflict (step 502), it responses, in step 503, with an accept, otherwise it rejects, in step 503, the request. Instead of simply rejecting or accepting, the inter-domain coordinator may initiate a command or instruction to a vendor-specific domain for solving a conflict, or more general, a SON interaction. The command or instructions may be sent to a single-domain coordinator in a neighboring domain. Different examples are illustrated with FIGS. 6 and 7.

Figure 6:
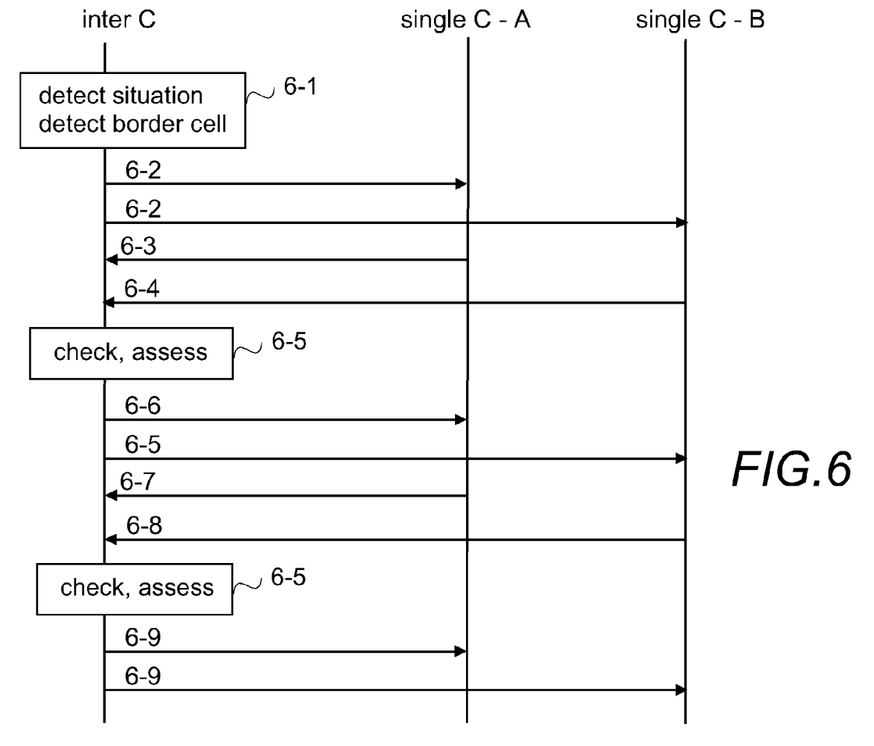
FIGS. 6 and 7 are signaling charts illustrating embodiments.
Figure 7:
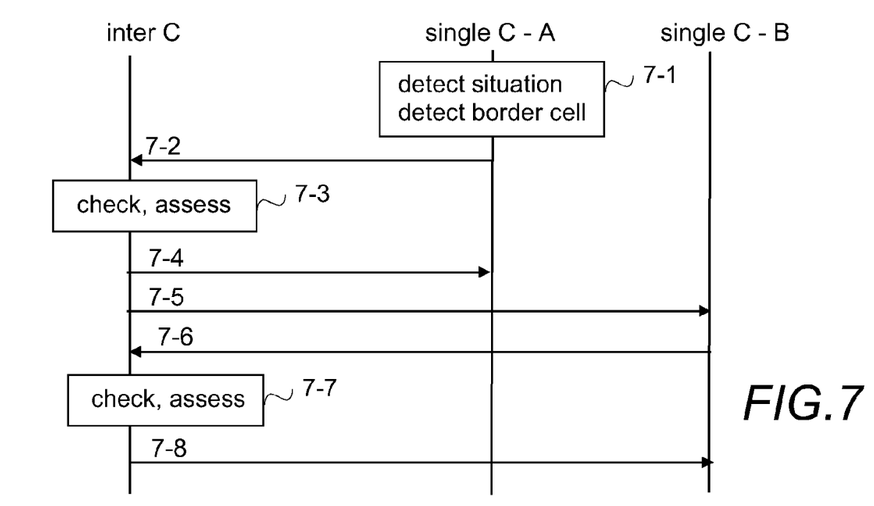

FIGS. 6 and 7 are signaling charts illustrating exemplary situations in which the inter-domain coordinator directs single-domain coordinators. The illustrated signaling may be changed between the directing unit in the inter-domain coordinator and the negotiating unit in a corresponding single-domain coordinator. Further, the illustrated signaling is over Itf-N interface.

In the illustrated examples reference to the system illustrated in FIG. 1 is made in order to clarify the example.

Referring to FIG. 6, the inter-domain coordinator (inter C) detects, in point 6-1, that there is a situation requiring an action in a vendor-domain. For example, the communication service provider may command the network management to optimize the coverage of radio access networks of different domains or a radio access network of a domain. In the illustrated example it is assumed that cell a3 has failed and there is a hole in the radio access coverage. The inter-domain coordinator may detect the situation by receiving an indication from the domain management system of vendor A domain, possibly via the single-domain coordinator (single C-A) or by means of receiving performance indicators, like KPIs (key performance indicator). However, it bears no significance how the inter-domain coordinator detects the situation. It suffices that the situation is detected. Further, the inter-domain coordinator detects, in point 6-1, that cell a3 is a "border cell". Therefore the inter-domain coordinator directs the single-domain coordinators in both domains to provide a suggestion how to fix the situation by sending message 6-2 to both single-domain coordinators, i.e. to single C-A and single C-B.

The single-domain coordinator A sends a suggestion in message 6-3. The suggestion may be to increase 30% of cell a2's coverage towards the former covered area of the failed cell a3.

The inter-domain coordinator waits until it receives a suggestion from the single-domain coordinator B in message 6-4. The suggestion may be to increase 20% of cell b1's coverage towards the former covered area of the failed cell a3.

In the illustrated example, the inter-domain coordinator then checks and assesses, in point 6-5, the intended increases, notices that they are allowable, there are no interference problems, but still a part of the coverage hole is not covered. Therefore the inter-domain coordinator request both single-domain coordinators to increase the suggestion by sending message 6-6 to single C-A and single C-B. The single-domain coordinators in turn send new their suggestions in messages 6-7 and 6-8, correspondingly. Then the inter-domain coordinator repeats the check and assessment performed in point 6-5. Point 6-5 and messages 6-6, 6-7, 6-8 are repeated (i.e. the process is iterative) until the coverage hole is fixed and there are no interference problems. Then the inter-domain coordinator directs the single-domain coordinators to perform the last suggested operation by sending messages 6-9. It should be appreciated that if the suggestions create a situation in which there is no coverage hole, but the interference is too high, messages 6-6 may direct to decrease the suggestion.

Further, it should be appreciated that if the first suggestions solve fix the hole without interference problems, no messages 6-6, 6-7, 6-8 are sent.

In another embodiment, if the first suggestions are acceptable although a part of the coverage hole is not covered, the first suggestions are accepted, i.e. there is no iterative process. Another round of fixing the hole will be triggered by next KPIs, for example.

Referring to FIG. 7, and to the same example in which cell a3 has failed and there is a hole in the radio access coverage, the single-domain coordinator A detects the situation in point 7-1. As above, it bears no significance how the single-domain coordinator A detects the situation. It suffices that the situation is detected. Further, the single-domain coordinator A detects, in point 7-1, that cell a3 is a "border cell". Therefore, the single-domain coordinator A sends a suggestion how to fix the situation in message 7-2. The suggestion may be to increase 35% of cell a2's coverage towards the former covered area of the failed cell a3.

The inter-domain coordinator then checks and assesses, in point 7-3, the intended increase, notices that it is allowable, there are no interference problems, but still a part of the coverage hole is not covered. Therefore the inter-domain coordinator, in addition to sending an acceptance to single-domain coordinator A in message 7-4, directs, by message 7-5, the single-domain coordinator B to increase cell b1's coverage towards the former covered area of the failed cell a3.

In response to message 7-5, the single-domain coordinator B sends a suggestion in message 7-6. The suggestion may be to increase 25% of cell b1's coverage towards the former covered area of the failed cell a3.

The inter-domain coordinator then checks and assesses, in point 7-7, the intended increase, notices that it is allowable, there are no interference problems, and that the coverage hole is covered. Therefore, the inter-domain coordinator sends an acceptance to single-domain coordinator B in message 7-8.

If there would still be a coverage hole, the inter-domain coordinator may be configured to direct the single-domain coordinators to provide further suggestions until there is no coverage hole.

If the suggestion received in message 7-2 would have corrected the problem, there would have been no need to send message 7-5. Further, instead of sending message 7-5 to single-domain B, message 7-4 may further direct the single-domain coordinator A to overcome the coverage hole. For example, message 7-4 may be "increase the change in coverage of a2 towards a3 to be 40%".

In another embodiment, the inter-domain coordinator waits for message 7-6 before sending message 7-4, and if the problem is not solved by the suggestions, instead of accepting them, may send a counter-suggestion or direct the single-domain coordinators to send further suggestions.

Other examples in which the inter-domain coordinator may initiate a command or instruction to a vendor-specific domain include following two: the inter-domain coordinator may instruct PCI (physical cell id) assignment functions to check and fix a possible PCI confusion/conflict, and the inter-domain coordinator may need to inform MRO (mobility robustness optimization) functions to keep the handover parameters of/with the failed cell so that they are reusable when the failed cell is in operation again.

The content in the suggestions (i.e. messages 6-3, 6-4, 6-7, 6-8, 7-2, 7-6) may be based on the following:

---

Domain ID: <RAT-ID + Vendor-ID + Release-ID>
Cell ID: <Global Cell ID>
One Intended Action and Its Impact Level on Cell Cell-ID of:
<
    Run SON Function (FunctionID, TargetCells, Purpose)
    Coverage Diameter Change (+n/−n)
    Coverage Heading Change (clockwise-m/anti-clockwise-m)
    Capacity Change (+n/−n)
    Mobility Change of
        Camping Allowance (+n/−n)
        Reselection Allowance (+n/−n)
        Handover Allowance (+n/−n)
        Ping-Pong Allowance (+n/−n)
in which
ID means identifier;
RAT means Radio Access Technology; and
n and m may represent
- relative magnitudes of the proposed changes
- absolute magnitudes of the proposed changes
- simplified expression of the magnitude of the proposed change (e.g. small/large as described above)

---

The steps/points, signaling messages and related functions described above in FIGS. 4 to 7 are in no absolute chronological order, and some of the steps/points may be performed simultaneously or in an order differing from the given one. Some of the steps/points or part of the steps/points can also be left out or replaced by a corresponding step/point or part of the step/point. For example, step 402 may be performed only to requests that are assessed as not having impact to neighboring domain, i.e. to each authorization request, it is first check, whether or they may have impact on a neighboring vendor (i.e. step 404 is performed after step 401) and if the answer is no, the vendor-specific allowance is checked (i.e. step 402 is performed after a "no" answer in step 404, and then either reject (step 403) or authorization (step 405) is sent. The signaling messages are only exemplary and may even comprise several separate messages for transmitting the same information. In addition, the messages may also contain other information.

Although in the above the embodiments have been described assuming that vendor domains are radio access networks, it is apparent to a person skilled in the art how to implement the embodiments to vendor domains providing core networks.

As is evident from the above, the terms "request" and "response" used herein, do no imply that a server-client approach is used. The terms "request" and "response" are used as general terms to represent asking and answering without restricting the embodiments to a particular way of various ways to implement the asking-answering mechanism. For example, a request from a single-domain coordinator to the inter-domain coordinator may be carried inside a notification from the domain management to the network management; and a response from the inter-domain coordinator to the single domain coordinator may be realized with an operation from the network management to the domain management.

It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
  detecting, by a single-domain coordinator, an authorization request relating to a self-organizing network operation that may have impact to a neighboring domain;
  sending, by the single-domain coordinator, a request indicating the self-organizing network operation to an inter-domain coordinator;
  receiving, by the single-domain coordinator, a response from the inter-domain coordinator; and
  if the response indicates non-acceptance, the single-domain coordinator, rejecting the authorization request to perform the self-organizing network operation,
  wherein the single-domain coordinator and the inter-domain coordinator are disposed at hierarchical levels which are different with respect to each other.

2. A method as claimed in claim 1, further comprising:
  receiving, by the single-domain coordinator, in the response, an acceptance; and
  accepting, by the single-domain coordinator, the authorization request.

3. A method as claimed in claim 1, further comprising:
  receiving, at the single-domain coordinator, from the inter-domain coordinator a command or an instruction relating to the self-organizing network; and
  acting accordingly by the single-domain coordinator.

4. A method as claimed in claim 1, further comprising:
  checking, by the single-domain coordinator, in response to detecting, whether the domain and the neighboring domain have the same vendor; and if they have the same vendor, the method further comprises:
  forwarding, by the single-domain coordinator, the authorization request to a single-domain coordinator in the neighboring domain;
  receiving, at the single-domain coordinator, a response from the single-domain coordinator in the neighboring domain; and
  forwarding, by the single domain coordinator, the response.

5. A method as claimed in claim 4, further comprising:
  checking, by the single-domain coordinator, in response to the same vendor, whether the self-organizing network operation has been predefined to be allowable to decide between single-domain coordinators;
  if allowable, forwarding, by the single-domain coordinator, the authorization request to the single-domain coordinator in the neighboring domain; and
  if not allowable, sending, by the single-domain coordinator, the request to the inter-domain coordinator.

6. A method as claimed in claim 1, further comprising:
  mapping, by the single-domain coordinator, information in the authorization request to the request, before sending the request to inter-domain coordinator, to Itf-N format; and
  mapping, by the single-domain coordinator, information in Itf-N format in the response to a format used in the domain.

7. A method comprising: receiving, at an inter-domain coordinator, a request from a single-domain coordinator in a domain, the request relating to a self-organizing network function operation;
  checking, by the inter-domain coordinator, whether the self-organizing network function operation causes a conflict with a neighboring domain; and
  if there is a conflict, sending, by the inter-domain coordinator, a response accepting the request,
  wherein the single-domain coordinator and the inter-domain coordinator are disposed at hierarchical levels which are different with respect to each other.

8. A method as claimed in claim 7, wherein, if the self-organizing network function operation does not cause a conflict, the method further comprises sending, by the inter-domain coordinator, a response accepting the request.

9. A method as claimed in claim 7, wherein, if the self-organizing network function operation causes a conflict, further comprising sending, by the inter-domain coordinator, to the single-domain coordinator, as a response, a suggestion how to change the requested operation in order to avoid the conflict.

10. A method as claimed in claim 7, wherein, if the self-organizing network function operation causes a conflict, the method further comprises sending, by the inter-domain coordinator, an instruction to a single-domain coordinator in the neighboring domain, the instruction either requesting a suggestion how to avoid the conflict or instructing the coordinator to adjust settings in the domain.

11. A method as claimed in claim 7, further comprising:
  detecting, by the inter-domain coordinator, that there is a problem in the network; and
  sending, by the inter-domain coordinator, an instruction to one or more single-domain coordinators in respective domains, the instruction either requesting to solve the problem or containing a suggestion how to solve the problem.

12. A computer program, embodied on a non-transitory computer readable medium, the computer program, when executed by a processor, causes the processor to perform any of the steps of a method as claimed in claim 1.

13. A single-domain coordinator apparatus, comprising:
  a processor configured to detect an authorization request relating to a self-organizing network operation that may have impact to a neighboring domain;

a transmitter configured to send a request indicating the self-organizing network operation to an inter-domain coordinator; and a receiver configured to receive a response from the inter-domain coordinator, wherein if the response indicates non-acceptance, the single-domain coordinator is configured to reject the authorization request to perform the self-organizing network operation, and wherein the single-domain coordinator is configured to be disposed at a hierarchical level which is different with respect to a hierarchical level of the inter-domain coordinator.

14. A system comprising:
a first network node; and
a second network node,
the first network node comprising:
  a processor configured to detect an authorization request relating to a self-organizing network operation that may have impact to a neighboring domain;
  a transmitter configured to send a request indicating the self-organizing network operation to an inter-domain coordinator; and
  a receiver configured to receive a response from the inter-domain coordinator,
  wherein if the response indicates non-acceptance, a single-domain coordinator is configured to reject the authorization request to perform the self-organizing network operation, and
  wherein the single-domain coordinator is configured to be disposed at a hierarchical level which is different with respect to a hierarchical level of the inter-domain coordinator; and
the second network node comprising:
  a receiver configured to receive a request from the single-domain coordinator in a domain, the request relating to the self-organizing network function operation; and
  a processor configured to check whether the self-organizing network function operation causes a conflict with the neighboring domain,
  wherein if there is a conflict, the inter-domain coordinator is configured to send a response rejecting the request.

15. A system as claimed in claim 14, the system further comprising an Itf-N interface between the first network node and the second network node.

16. A system as claimed in claim 14, wherein the first network node belongs to a domain management of an operations, administration and maintenance of the system and the second network node belongs to a network management of the operations, administration and maintenance of the system.

17. A system as claimed in claim 14, wherein the second network node is configured to use a database having abstracted network information, and the first network node is configured to map abstracted information received from the second network node into a detailed information and detailed information to be sent to the second network node to the abstracted information.

18. An inter-domain coordinator apparatus, comprising: a receiver configured to receive a request from a single-domain coordinator in a domain, the request relating to a self-organizing network function operation; and
a processor configured to check whether the self-organizing network function operation causes a conflict with a neighboring domain,
wherein if there is a conflict, the inter-domain coordinator is configured to send a response rejecting the request,
wherein the single-domain coordinator and the inter-domain coordinator are disposed at hierarchical levels which are different with respect to each other.

* * * * *